United States Patent [19]

Beijar et al.

[11] Patent Number: 4,540,848
[45] Date of Patent: Sep. 10, 1985

[54] ELECTRIC HIGH-VOLTAGE EARTHQUAKE-RESISTANT BUSHING

[75] Inventors: Ole Beijar; Mats Mattsson, both of Ludvika, Sweden

[73] Assignee: Asea AB, Västerås, Sweden

[21] Appl. No.: 632,073

[22] Filed: Jul. 18, 1984

[30] Foreign Application Priority Data

Aug. 4, 1983 [SE] Sweden .................. 8304264

[51] Int. Cl.³ .................. H01B 17/26; H01F 27/04
[52] U.S. Cl. .................. 174/152 R; 174/31 R; 174/161 R
[58] Field of Search .................. 174/12 BH, 31 R, 42, 174/75 F, 152 R, 161 R; 52/167; 200/301

[56] References Cited

U.S. PATENT DOCUMENTS

| 3,856,242 | 12/1974 | Cook | 52/167 X |
| 4,267,400 | 5/1981 | Kishida | 174/152 R X |
| 4,304,956 | 12/1981 | Kishida | 174/152 R X |

FOREIGN PATENT DOCUMENTS 57-160107  10/1982  Japan .................. 174/152 R

Primary Examiner—Laramie E. Askin
Attorney, Agent, or Firm—Pollock, Vande Sande & Priddy

[57] ABSTRACT

An elongated electric bushing for a transformer, reactor, or the like is provided with a flexible intermediate flange (3) which comprises a plurality of spring devices (28) oriented in the longitudinal direction of the bushing, and a cardan assembly (11) for taking up longitudinally directed forces arising in case of an earthquake.

2 Claims, 5 Drawing Figures

ELECTRIC HIGH-VOLTAGE EARTHQUAKE-RESISTANT BUSHING

TECHNICAL FIELD

The present invention relates to an electric high-voltage bushing for an electric apparatus enclosed in a casing, said bushing comprising an elongated tube made of insulating material and having a longitudinal axis, a conductor extending along said axis, said conductor being surrounded by said tube and electrically connected to said apparatus, and a flexible device constituting a mechanical connection between said tube and said casing.

BACKGROUND ART

A bushing of the above kind is previously known from the published Japanese patent application No. 57-160,107 dated Oct. 2, 1982. With the known bushing it is difficult to obtain suffcient flexibility for bending moments and at the same time rigidity as regards longitudinal forces.

BRIEF DESCRIPTION OF THE INVENTION

A bushing according to the invention is preferably designed for operating voltages in excess of 200 kV.

Investigations have shown that the mechanical stresses, to which a transformer bushing of the above-mentioned type is subjected in case of earthquakes, are usually limited to acceptable values if the natural frequency of the bushing is about 1 Hz. A bushing according to the invention is constructed in such a way that its natural frequency lies within the range of 0.3 to 3 Hz, preferably in the range of 0.6 to 1.5 Hz.

The object of the invention is to design the bushing with the flexibility that is required if its natural frequency shall be in the vicinity of 1 Hz and at the same time, in case of earthquakes, be able to achieve such a limitation of oscillating and axial movements of the bushing that these cannot lead to a detrimental mechanical stress on a terminal device located in the transformer tank, or on some winding part connected thereto. In a bushing according to the invention, a flexible device comprises a first annular member enclosing an axis, a second annular member enclosing said axis and a force transmitting ring enclosing said axis, said first annular member being mechanically connected to an insulating tube, said second annular member being mechanically connected to an apparatus casing, said first annular member being arranged in axially spaced relationship with said second annular member, said ring being arranged with rotatability in relation to said first and said second annular members about a first and a second, respectively, transversally directed axis of rotation by means of a first bearing device and a second bearing device, respectively, said first bearing device being fixed to said first annular member, said second bearing device being fixed to said second annular member, said first axis of rotation being perpendicularly oriented with respect to said second axis of rotation; a plurality of spring devices being attached to said annular members, each spring device constituting a flexible mechanical connection between said first annular member and said second annular member.

BRIEF DESCRIPTION OF THE DRAWINGS

In the following the invention will be described with reference to the accompanying schematic drawings, wherein.

DESCRIPTION OF A PREFERRED EMBODIMENT

Figure 1:
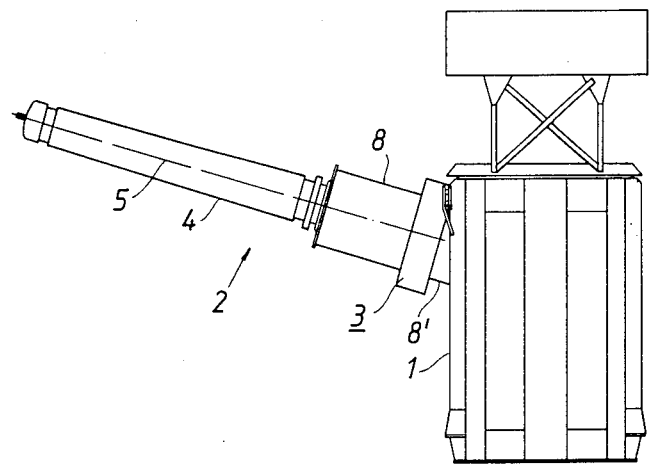
FIG. 1 shows a side view of a transformer unit provided with a bushing according to the invention.
Figure 2:
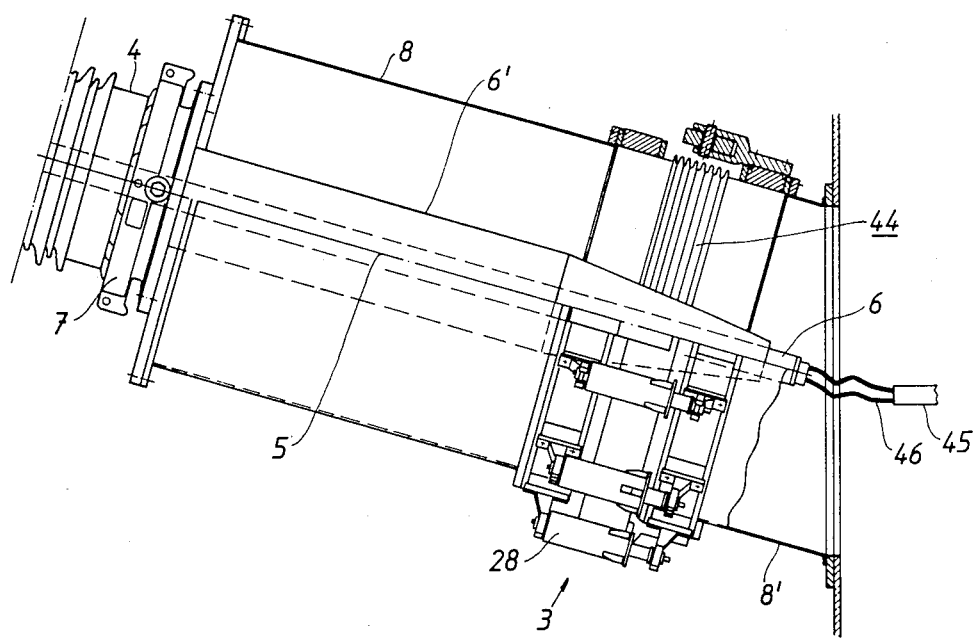
FIG. 2 shows a part of the transformer unit shown in FIG. 1, partly in a side view, partly in axial section through a longitudinal symmetry axis of the bushing shown in FIG. 1.
Figure 3:
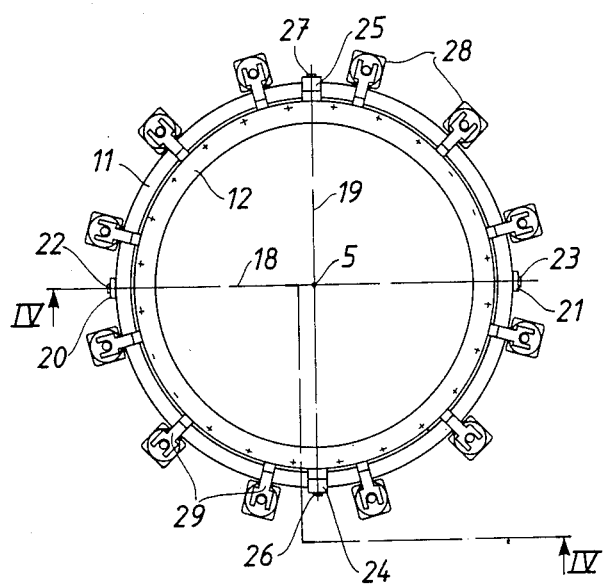
FIG. 3 shows an axial view of a flexible intermedate flange included in the bushing shown in FIGS. 1 and 2.
Figure 5:
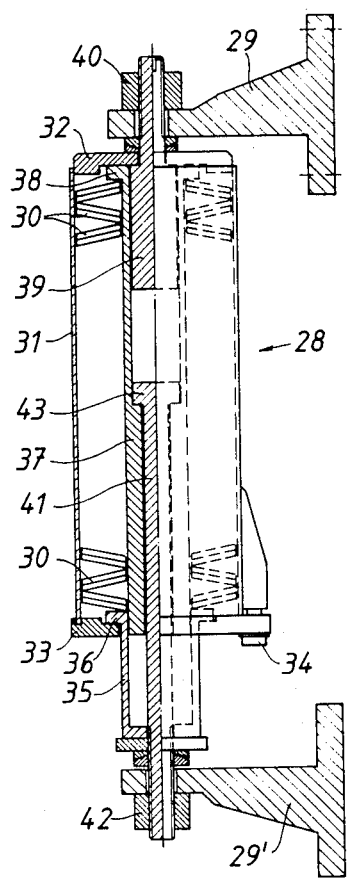
FIG. 5 shows an elongated substantially circular-cylindrical spring member, partly in a side view, partly in section through a longitudinal center line.
Figure 4:
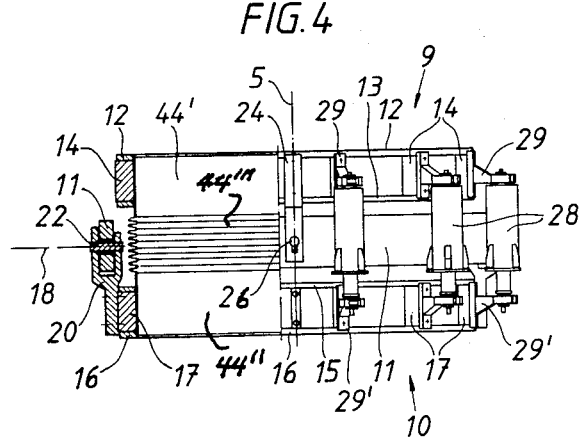
FIG. 4 shows the above-mentioned intermediate flange, partly in a side view, partly in section along IV—IV in FIG. 3.

In the drawings, 1 designates an oil-filled transformer tank and 2 a bushing fixed thereto which includes a flexible intermediate flange 3 rigidly connected to the transformer tank. The bushing 2 comprises a porcelain tube 4 having a symmetry axis 5 extending in the longitudinal direction. The porcelain tube 4 surrounds a coaxially arranged conductor 6 as well as a capacitor body 6' surrounding said conductor. A metallic sleeve 7 is mechanically connected to the lower end of the porcelain tube 4.

The sleeve 7 is flanged to the outer end of a rigid, metallic, substantially hollow-cylindrical body 8, which at its inner end is flanged to the flexible intermediate flange 3. Said flange is mechanically connected to a wall of the transformer tank 1 via a metallic, obliquely cut-off hollow cylinder 8'. The hollow cylinder 8' is, via a hole in the wall, arranged in hydraulic connection with a an oil-filled spaced defined by the transformer tank 1. The transformer tank 1 encloses an iron core (not shown in the drawings) provided with windings. The conductor 6 is connected to a high-voltage winding 45 via a flexible electric connection means 46.

The flexible intermediate flange 3 includes an axial outer annular member 9 arranged in rigid mechanical connection with the flange 7, an axially inner annular member 10 arranged in rigid mechanical connection with the transformer tank, and an intermediate ring 11, which in the following is denoted by the term "cardan ring". The two members 9 and 10 are substantially mutually identical as regards shape and size, and together with the cardan ring 11 they are coaxially arranged in relation to the symmetry axis 5. The annular member 9 includes two circular and mutually parallel steel rings 12 and 13 which are rigidly connected to each other by means of a plurality of axially directed steel bars 14 distributed along the periphery, said steel bars being welded between the rings 12 and 13. In the same way, the annular member 10 includes two circular steel rings 15 and 16, and a plurality of axially directed steel rods 17 welded between said steel rings 15 and 16.

The cardan ring 11 is arranged with rotatability about an axis of rotation 18 and about an axis of rotation 19, said axes 18 and 19 lying in one and the same plane, making an angle of 90° with each other and being perpendicular to the symmetry axis 5. The ability to rotate about the axis 18 is obtained with the aid of a bearing device which is fixed to the transformer tank 2 via the stiff intermediate flange 8'. The bearing device comprises the annular member 10, two double-armed forks 20 and 21 fixed to the annular member 10 and arranged diametrically with respect to each other, as well as two circular-cylindrical pins 22 and 23 which are coaxially arranged with respect to the axis of rotation 18 and supported by the forks 20 and 21, respectively. The cardan ring has two holes diametrically bored with respect to each other, each of said holes—with a play sufficient to obtain rotatability—surrounding a pin 22 and 23, respectively.

In a corresponding way, a bearing means for the cardan ring is arranged in rigid mechanical connection with the porcelain tube 4, namely a bearing means constituted by the annular member 9, and two forks 24 and 25 fixed to the bearing means 9 and diametrically arranged with respect to each other. These forks are congruent with the forks 20 and 21 and provided with circular-cylindrical pins 26 and 27, respectively, which are coaxially arranged about the axis of rotation 19 and which are each inserted into a hole in the cardan ring in the same way as the pins 22 and 23. In each one of the forks 21, 22, 24 and 25, the minimum distance between the fork arms is somewhat greater than the thickness of the cardan ring 11, which is made with uniform thickness. The distance between the arms increases in the direction of the arms and is greatest at the outer ends of the arms.

Twelve elongated, mutually identical spring devices 28, directed in parallel with the symmetry axis 5, are evenly distributed along the periphery of the flexible intermediate flange 3. The two ends of the spring devices 28 are fixed to corresponding annular members 9 and 10, respectively, by means of corresponding brackets 29 and 29', respectively, fixed to the annular members. One of the axes of rotation mentioned above, namely the axis 18, is horizontal, which under normal conditions (not earthquake) means that the upper six spring devices are loaded with tensile forces whereas the lower six are loaded with compressive forces.

The spring device 28 includes a plurality of cup springs 30 formed with central through-holes. The cup springs are enclosed in a circular-cylindrical tube 31 which is sealed at one end by means of a circular plate, 32, welded to the tube, and at the other end by means of a lid 33 which is fixed by means of a plurality of screw bolts 34. The lid 33 has a circular through-hole in which a guiding cup 35 having a circular cross-section is arranged with a certain play, the freedom of movement of said guiding cup longitudinally in respect of the spring device being limited in one direction by means of a flange 36 formed at the upper edge of the guiding cup. A draw tube 37, having circular inner and outer cross-sections, is extending through the cup springs 30 and inserted with one end into the guiding cup 35 with slip fit, whereas its other end is formed with a flange 38 which is pressed against the plate 32 by the cup springs 30. A guide pin 39 comprises a thicker part, which is inserted into the draw tube 37 with a suitable play, as well as a thinner part which is passed through the end plate 32 and through a bracket 29, to which it is secured by means of a nut 40. A draw bolt 41 is arranged with slip fit in the draw tube 37. One end of the draw bolt 41 is passed through a hole in the bottom of the guiding cup 35 and through a hole in a bracket 29', to which it is fastened by means of a nut 42.

The draw bolt 41 has a circular-cylindrical portion 43 with a relatively large diameter which—when applying a tensile force on the draw bolt 41—makes contact with an annular axially directed stop surface on the draw tube 37.

The components 30, 31, 35, 37, 39, 41 are coaxially arranged in relation to each other.

When applying a tensile force on the spring device 28, the tensile force is transmitted via the draw bolt 41 to the draw tube 37, whereby the draw tube 37 is inserted further into the guiding cup 35 and the flange 38 provides compression of the spring assembly. When the degree of compression approaches the value maximally permissible when non-elastic deformation of the cup springs 30 is to be avoided, additional compression is prevented by the fact that one end of the draw tube 37 comes into mechanical contact with the bottom of the guiding cup 35.

When the spring device 28 is subjected to a compressive load, the guiding cup 35 is pressed in through the opening in the lid 33, whereby the flange 36 transmits the compressive force to the spring assembly and provides a compression thereof. When the degree of compression approaches the maximally permissible value, additional compression is prevented by the fact that the bottom of the guiding cup 35 comes into mechanical contact with one end surface of the draw tube 37.

The flexible intermediate flange 3 is provided with a bellows 44 of stainless steel. The bellows has two hollow-cylindrical portions 44' and 44" as well as an intermediate corrugated portion 44'''. The bellows 44 is pressure-tightly connected to the structural elements 8 and 8'.

The play between the pins 22, 23, 26, 27 and the corresponding holes in the cardan ring is so small that no mentionable axial movement of the tube 4 in relation to the casing 1 can take place.

We claim:

1. An electric high-voltage bushing (2) for an electric apparatus enclosed in a casing (1), said bushing comprising an elongated tube (4) made of insulating material and having a longitudinal axis (5), a conductor (6) extending along said axis, said conductor being surrounded by said tube and electrically connected to said apparatus, and a flexible device (3) constituting a mechanical connection between said tube and said casing, wherein said flexible device (3) comprises a first annular member (9) enclosing said axis, a second annular member (10) enclosing said axis and a force transmitting ring (11) enclosing said axis, said first annular member (9) being mechanically connected to said tube (4), said second annular member (10) being mechanically connected to said casing (1), said first annular member (9) being arranged in axially spaced relationship with said second annular member (10), said ring (11) being arranged with rotatability in relation to said first and said second annular members about a first (19) and a second (18), respectively, transversally directed axis of rotation by means of a first bearing device and a second bearing device, respectively, said first bearing device (24, 25, 26, 27) being fixed to said first annular member (9), said second bearing device (20, 21, 22, 23) being fixed to said second annular member (10), said first axis of rotation (19) being perpendicularly oriented with respect to said second axis of rotation (18); a plurality of spring devices (28) being attached to said annular members, each spring device (28) constituting a flexible mechanical connection between said first annular member (9) and said second annular member (10).

2. An electric high-voltage bushing as claimed in claim 1, wherein a bellows (44), coaxially arranged with respect to said annular members (9, 10), extends axially between them to constitute a pressure-tight hydraulic connection between said annular members.

* * * * *